Dec. 20, 1966 J. G. FALCIONI 3,292,413
RIVETING APPARATUS
Filed Oct. 21, 1963
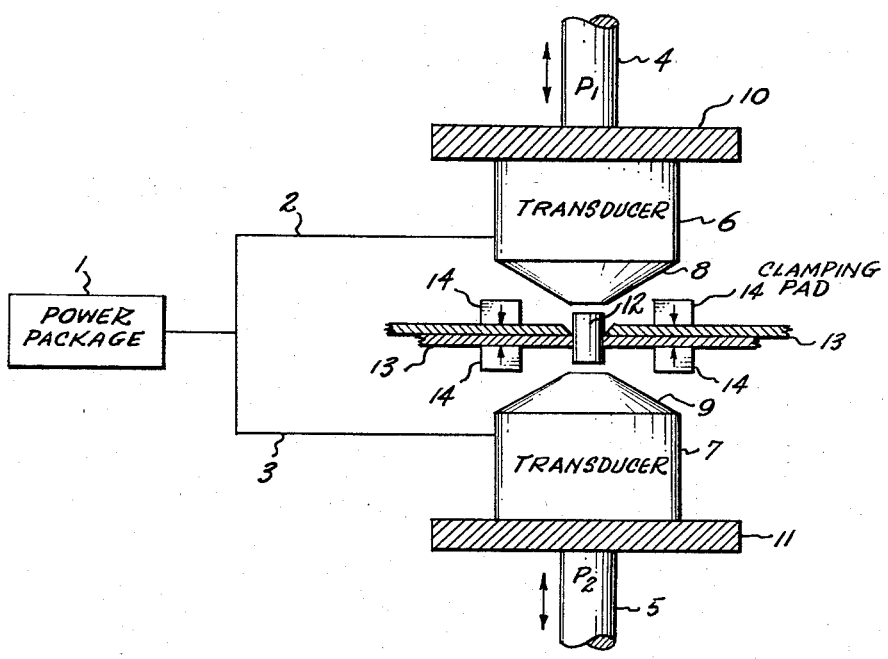
INVENTOR.
JOSEPH G. FALCIONI
BY *L E Carnahan*
AGENT

United States Patent Office 3,292,413
Patented Dec. 20, 1966

3,292,413
RIVETING APPARATUS
Joseph G. Falcioni, Tacoma, Wash., assignor to The Boeing Company, Seattle, Wash., a corporation of Delaware
Filed Oct. 21, 1963, Ser. No. 317,539
1 Claim. (Cl. 72—377)

This invention relates to rivet setting apparatus, and more particularly to rivet setting apparatus for aircraft type rivets.

Rivet setting machines are well known and normally comprise a movable or slidable rivet driver rod which is capable of being suddenly thrust forwardly or downwardly to strike a positioned rivet and to press it with considerable power against an aligned opposed anvil or bucking surface.

In prior known rivet setting machines, the power means employed have commonly involved continuously rotating mechanical elements such as crank shafts which necessitate the use of flywheels and connecting rods to convert rotational energy into reciproctaing motion required in the work stroke for such machines, thus entailing considerable weight and loss of energy. Pneumatic means have been employed for rivet setting but have involved a prior accumulation of compressed air and the storage thereof in tanks or containers as well as hose lines and hose connections which entail certain disadvantages. Electromagnetic force, such as a solenoid or an electromagnet have been utilized to supply the power required in the production of the work stroke in rivet setting machines but are limited in application by the electromagnetic force derived therefrom.

This invention solves the problems relating to setting aircraft type rivets, i.e., machine weight, end product, maintenance, reliability, production time, noise, and rivet sealing.

Basically the invention involves the use of two transducers motivated to deliver energy to a slug (cylindrical piece of metal) or rivet which subjects the slug or rivet to a strain equal to about two times that of a single transducer and a bucking bar (anvil). The energy delivered to the slug or rivet in this mode reduces the lost energy absorbed by the fastened parts by virtue of the amplitude being very small and because the plane of zero (0) motion in material flow is within the outside surfaces of the riveted parts.

Therefore, it is an object of this invention to provide a material working apparatus which utilizes a plurality of opposing transducers.

A further object of the invention is to provide a rivet setting apparatus.

A still further object of the invention is to provide a rivet setting apparatus which solves the problems related to setting aircraft type rivets.

Another object of the invention is to provide a rivet setting apparatus which utilizes a plurality of opposing transducers.

Another object of the invention is to provide a rivet setting apparatus which utilizes two opposed transducers which may be motivated simultaneously, slightly out of phase, under programmed sequences, and under roving frequencies.

Other objects of the invention not specifically set forth above will become readily apparent from the accompanying description and drawing in which:

The single figure is a diagrammatic view of the invention with portions shown cut away or in cross-section for clarity.

As shown, the invention comprises a power package 1 which delivers sonic or ultrasonic frequencies synchronously through connections 2 and 3 to transducers 6 and 7, respectively. The frequency phase for both connections 2 and 3 is the same, however, since the physical placement of transducers 6 and 7 are 180° from each other, the direction of mechanical motion of the transducers is diametrically opposite. In the embodiment shown transducers 6 and 7 are of the magnetostrictive type. However, other types such as piezoelectric, barium titanate, and electro-mechanical transducers may be utilized. Transducers 6 and 7 are shown including exponential horns 8 and 9, respectively, which may be omitted if magnification of the transducers amplitude is not required. Horns 8 and 9 may be integral with transducers 6 and 7, or removably mounted thereon.

Transducers 6 and 7 are moved toward each other by forces $P_1$ and $P_2$ which are created by power sources generally indicated by 4 and 5 respectively, thereby imposing a load to slug or rivet 12 which causes plastic flow and expansion thereof against sheets 13. The force $P_1$ may be equal to or different than $P_2$, the forces being dictated by the process. The differential in force ($\Delta P$), if any, will be balanced by the force transmitted to the rivet 12 through sheets 13 to clamping pressure pads 14. Pad 14 will restrain or control the squeeze between the sheets 13 and absorb the $\Delta P$ in either direction, if a difference in pressure exists. Clamping pads 14 may be electromagnets. Pads 14 will press the parts to be riveted together to assure that the riveted parts are in intimate contact thus optimizing structural integrity. Forces $P_1$ and $P_2$ are of magnitudes dictated by the process which is controlled by the achievement of a desirable end product and the fabrication time. Positioned between transducer 6 and power source 4 and between transducer 7 and power source 5 are masses 10 and 11, respectively, which are of sufficient weight so as to allow insignificant motion losses, thereby forcing the other end of the transducer to achieve maximum amplitude.

In addition to the novel mode of operation set forth above (synchronous delivery of blows) the transducers 6 and 7 may be made to operate in the following ways to achieve desirable end results.

(1) *Slightly out of phase.*—In setting a preformed countersink rivet the blow may first be delivered to the preformed countersink side slightly ahead of the corresponding blow delivered to the shank end. This may result in a loss of impact energy but would help to assure that the countersink is sealed and that the installed fastener more fully fills the hole and that the fastened sheets are in intimate contact. This mode of operation may be carried out by a single power package with phase shift apparatus (not shown) for the transducers, or by a separate power package for each transducer.

(2) *Programmed mode.*—To achieve various geometrical or metallurgical qualities; the transducers may be made to operate to programmed sequences, such as a mixture of (a) synchronous in phase, (b) intermittent (both in or out of phase) and, (c) synchronous except one vibrating in even multiples of the other in or out of phase, or other possible combinations of modes.

(3) *Roving frequencies.*—(a) One transducer can be vibrated with a constant frequency with constant or variable amplitude while the second transducer may be vibrated with a variable frequency and constant or variable amplitude.

(b) One transducer can be vibrated with a varible frequency with constant or variable amplitude while the second transducer may be vibrated in the same mode, synchronous or non-synchronous.

All of the above modes or combinations can be operated with $P_1 = P_2$, $P_1$ or $P_2$, or $P_1$ or $P_2$ approximately equal to zero.

While not shown, and to reduce maintenance, the opposing transducers can be switched to "On" position by electrical current switching by demand when a circuit is completed at the instant contact with the rivet or slug is made by the opposing transducers.

It has been shown that this invention solves the problems set forth above in that (1) it allows the use of light machines and lighter portable tools since the delivered force does not require continuous opposing restraint, (2) the reduction in continuous and variable restraining forces reduces machine deflections which in turn will contribute to a more uniform and geometrically symmetrical end product, (3) the reduction in components reduces the maintenance and makes trouble shooting easier, (4) reliability is increased since it is less susceptible to environmental changes, (5) production time lowered because more effective energy is imparted in the forming in a shorter time, (6) noise level reduced since most of the energy is utilized in the forming and less converted to audible energy through the panel with operation above 20,000 c.p.s. being practically inaudible, and (7) since the forming rates can be accurately controlled; optimum parameters can be established to achieve a hermetic seal between the rivet and the fastened sheets, thus contributing to fuel and gas tight riveting.

In portable units utilizing the invention, forces $P_1$ and $P_2$ may be supplied by manpower, if desired, the remaining portion of the disclosed apparatus being the same. In the case of hand held transducers in slug or rivet installation, the pads 14 can additionally be utilized to obtain all or part of the $P_1$ and $P_2$ force required.

While the description has been directed to the art of riveting, such processes as dimpling, coining, stamping, and forming could adapt the novel principle of opposing transducers as described herein.

Although a particular embodiment of the invention has been illustrated and described, it will be obvious to those skilled in the art that various changes and modifications may be made without departing from the invention, and it is intended to cover in the appended claim all such changes and modifications that come within the true spirit and scope of the invention.

What I claim is:

The method of ultrasonically setting rivets comprising the steps of clamping material to be riveted, positioning the rivet to be set with respect to the material, positioning opposed transducers against the rivet for continuous engagement therewith until termination of the setting operation, and supplying energy to the transducers so that the transducers vibrate at a frequency in excess of 20,000 cycles per second, thus setting the rivet.

References Cited by the Examiner

UNITED STATES PATENTS 3,001,279  9/1961  Sherrill _____ 29—526

CHARLES W. LANHAM, *Primary Examiner.*

G. P. CROSBY, *Assistant Examiner.*